United States Patent [19]

Handa et al.

[11] Patent Number: 5,699,371

[45] Date of Patent: Dec. 16, 1997

[54] LIGHT PULSE GENERATOR

[75] Inventors: Ryouji Handa, Tokyo; Nobuo Tomita, Higashiibaraki-gun; Yoshitaka Enomoto, Mito, all of Japan

[73] Assignees: Ando Electric Co., Ltd.; Nippon Telegraph And Telephone Corporation, both of Tokyo, Japan

[21] Appl. No.: 601,441

[22] Filed: Feb. 14, 1996

[30] Foreign Application Priority Data

Feb. 27, 1995 [JP] Japan .................................. 7-038860

[51] Int. Cl.$^6$ ...................................... H01S 3/30
[52] U.S. Cl. .......................... 372/6; 372/30; 372/700
[58] Field of Search ........................... 372/6, 14, 25, 372/30, 94, 700; 359/184, 264, 341

[56] References Cited

U.S. PATENT DOCUMENTS

| | | | |
|---|---|---|---|
| 5,233,619 | 8/1993 | Furuhashi et al. | 372/6 |
| 5,309,455 | 5/1994 | Adachi et al. | 372/25 |
| 5,519,526 | 5/1996 | Chua et al. | 359/152 |

*Primary Examiner*—Rodney B. Bovernick
*Assistant Examiner*—Robert E. Wise
*Attorney, Agent, or Firm*—Finnegan, Henderson, Farabow, Garrett & Dunner, L.L.P.

[57] ABSTRACT

A light pulse generator is disclosed comprising an optical main-loop, a pumped-light source, a delay optical fiber, and an optical switch controller. The optical main-loop circulates a light and includes a light mixer, a light isolator, an erbium-doped optical fiber, an optical switch, a light divider, and an optical fiber coupler. The pumped-light source generates a pumped-light and introduces the pumped-light into the optical main-loop through the light mixer. The terminals of the delay optical fiber are connected to the optical fiber coupler so as to form an optical sub-loop for spreading a pulse width of a light pulse circulating in the optical main-loop. The optical switch controller switches the optical switch to an ON-state. As a result, a positive feedback amplification is carried out in the optical main-loop and an output light pulse having a sufficiently long pulse width and sufficiently high power is picked up from the optical loop through the light divider.

3 Claims, 4 Drawing Sheets

Pin

Pout

Sci

Popi

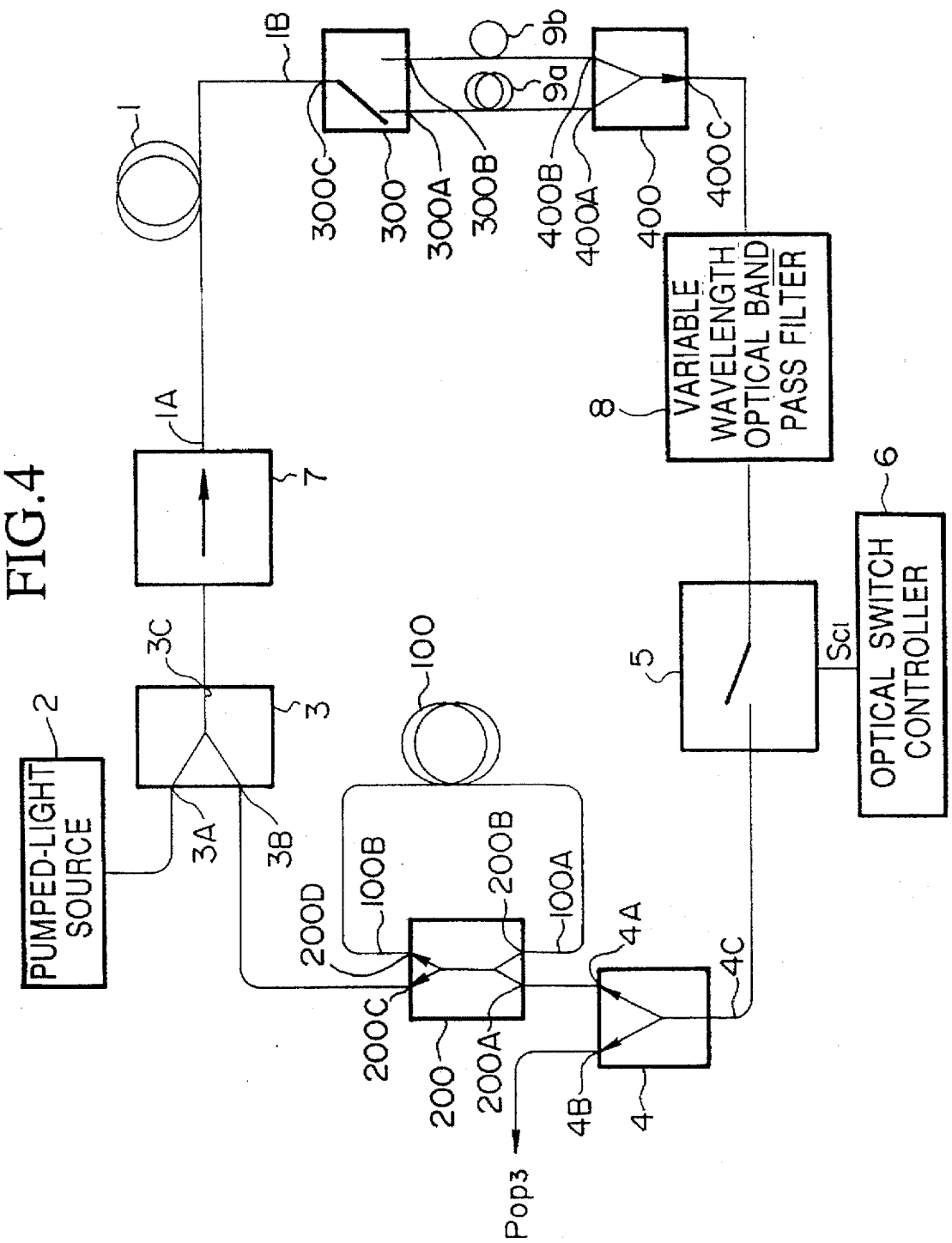

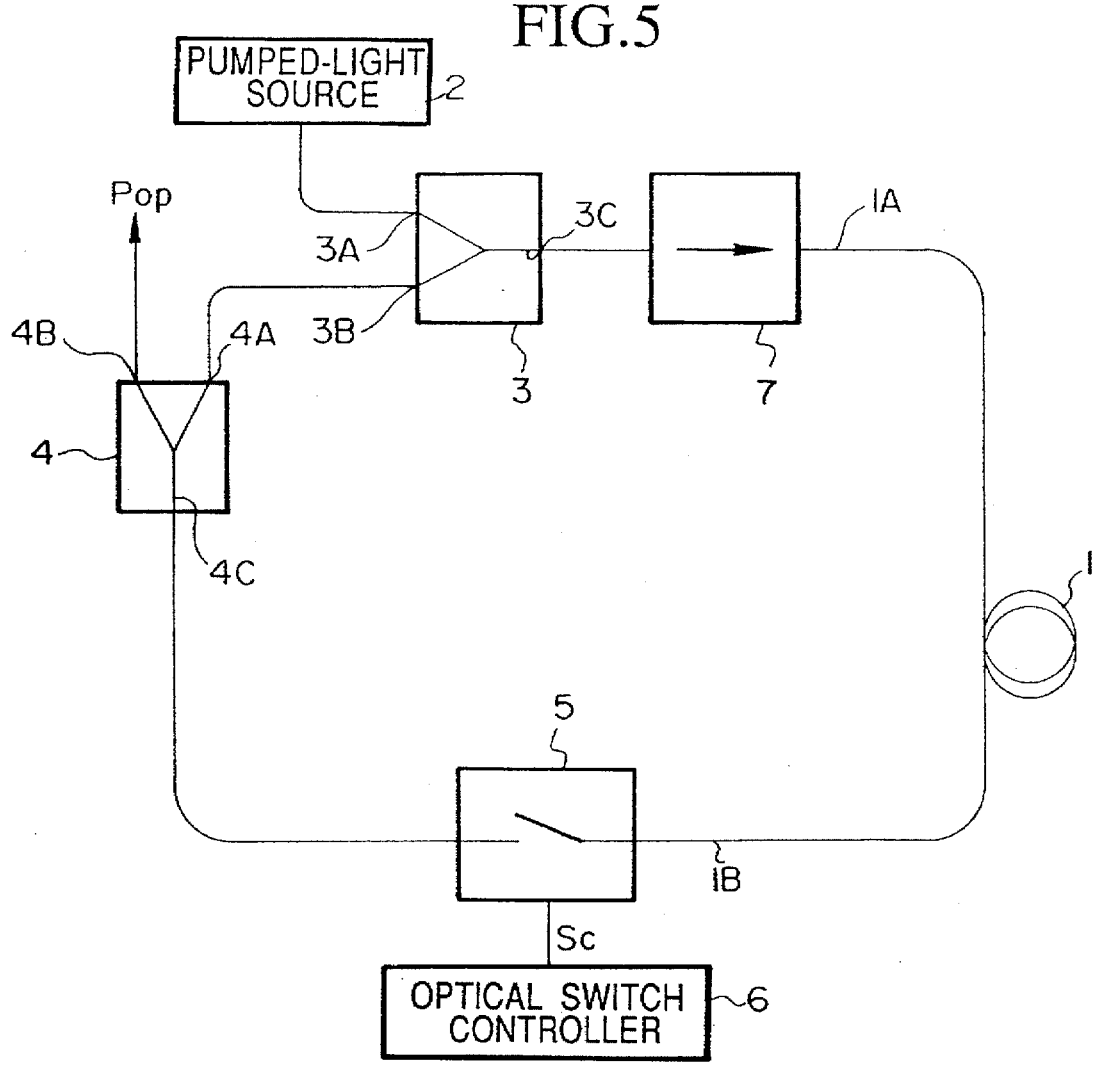
FIG.5
FIG.6A Sc
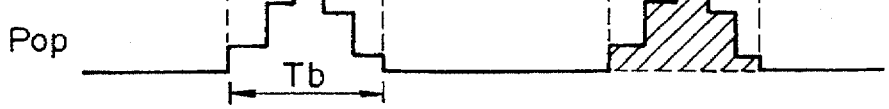
FIG.6B Pop

LIGHT PULSE GENERATOR

BACKGROUND OF THE INVENTION

1. Field of the Invention

The present invention relates to a light pulse generator which can generate light pulses at high power and is used in optical apparatuses such as in an OTDR (Optical Time Domain Reflectometer).

2. Background Art

FIG. 5 is a block diagram showing the configuration of an example of a conventional light pulse generator.

In FIG. 5, an erbium-doped optical fiber 1 is an optical fiber having an erbium-doped core.

A pumped-light source 2 is a light source for continuously emitting a pumped-light at a constant power.

A light mixer 3 has input terminals 3A and 3B and an output terminal 3C. The light mixer 3 mixes input signal lights of the input terminals 3A and 3B, and outputs the mixed light from the output terminal 3C. The pumped-light emitted from the pumped-light source 2 is supplied to the input terminal 3A of the light mixer 3.

A light isolator 7 is inserted between the output terminal 3C of the light mixer 3 and a terminal 1A of the erbium-doped optical fiber 1. The role of the light isolator 7 is to control the flow of the signal light. That is to say, the right direction in FIG. 5 is a forward direction of the light isolator, and the left direction in FIG. 5 is a reverse direction of the light isolator. Therefore, the light isolator 7 transmits a signal light from the light mixer 3 to the erbium-doped optical fiber 1 with no loss or at a very low loss. In contrast, a signal light which is outputted from the erbium-doped optical fiber 1 is attenuated by the light isolator 7. Thus, the flow of the signal light from the erbium-doped optical fiber 1 to the light mixer 3 is prevented.

The other terminal 1B of the optical fiber 1 is connected to an input terminal of an optical switch 5. The transmission loss of signal light of the optical switch 5 is controlled based on an electric control signal $S_c$. When the level of the control signal $S_c$ is high, the optical switch 5 is in an ON-state. When the level of the control signal $S_c$ is low, the optical switch 5 is in an OFF-state. An optical switch controller 6 supplies the control signal $S_c$ to the optical switch 5 to control the ON/OFF state of the optical switch.

A light divider 4 has an input terminal 4C and output terminals 4A and 4B. The input terminal 4C is connected to the output terminal of the optical switch 5 via an optical fiber. The output terminal 4A is connected to the input terminal 3B of the above-described light mixer 3. The output terminal 4B is a light pulse output terminal of the light pulse generator from which light pulses $P_{op}$ are sequentially outputted.

Next, description will be given with respect to the operation of the light pulse generator shown in FIG. 5. FIG. 6A shows an example of a waveform of the control signal $S_c$ outputted from the optical switch controller 6. Periodic pulses having a rectangular waveform are outputted as the control signal $S_c$ as shown in FIG. 6A.

When the level of the control signal $S_c$ is low, the optical switch 5 is in the OFF-state. Therefore, the following operation is carried out.

The pumped-light emitted from the pumped-light source 2 is supplied to the input terminal 3A of the light mixer 3. This pumped-light is then outputted from the output terminal 3C of the light mixer 3 and the pumped-light thus outputted is supplied to the erbium-doped optical fiber 1. Energy is accumulated in the erbium-doped optical fiber 1 due to the pumped-light thus supplied. However, the optical switch 5 is in the OFF-state. Therefore, no signal light is supplied to the light divider 4 from the erbium-doped optical fiber 1.

When the level of the control signal $S_c$ is changed to high, the optical switch 5 turns to the ON-state. As a result, an optical loop including the light mixer 3, the optical isolator 7, the erbium-doped optical fiber 1, the optical switch 5, and light divider 4, is closed. The level of the control signal $S_c$ remains high for a short period of time, as shown in FIG. 6A. While the control signal $S_c$ remains at a high level, a signal light having a wavelength. band of 1.55 μm is outputted from the terminal 1B of the erbium-doped optical fiber 1 and the signal light passes through the optical switch 5. As a result, a light pulse is obtained from the output terminal of the optical switch 5. This light pulse is supplied to the light divider 4 and the light pulse thus supplied is then divided by the light divider 4.

The output light pulse obtained from the output terminal 4B of the light divider 4 is supplied to an external device (not shown) as an output light pulse $P_{op}$.

The output light pulse obtained from the output terminal 4A is supplied to the input terminal 3B of the light mixer 3. The light pulse thus supplied is supplied to the erbium-doped optical fiber 1 via the light mixer 3 and the light isolator 7.

This causes an increase in the level of amplitude of the signal light outputted from the terminal 1B of the erbium-doped optical fiber 1. That is to say, a positive feedback amplification is carried out in the optical loop. Thus, the level of amplitude of the light pulse obtained from the optical switch 5 is increased.

The light pulse outputted from the optical switch 5 is divided by the light divider 4 and one of the divided light pulses is outputted from the output terminal 4B. As a result, the level of amplitude of the light pulse $P_{op}$ obtained from the light divider 4 is then increased.

The other light pulse obtained from the output terminal 4A circulates through the optical loop consisting of the light mixer 3, the optical isolator 7, the erbium-doped optical fiber 1, the optical switch 5, and light divider 4.

In this manner, the light pulse repeatedly circulates through the optical loop and a positive-feedback amplification is carried out. The level of amplitude of the light pulse is increased step by step every time the light pulse circulates through the optical loop.

On the other hand, when the light pulse is emitted from the output terminal 1B of the erbium-doped optical fiber 1, the energy accumulated in the fiber is decreased due to the light emission. Therefore, the level of amplitude of the light pulse $P_{op}$ decreases step by step due to the decrease of the energy in the erbium-doped optical fiber 1.

As a result, a light pulse $P_{op}$ which has a plurality of steps in the leading and trailing portions is obtained from the output terminal 4B. FIG. 6B shows a light pulse $P_{op}$ which is an example of a light pulse $P_{op}$ obtained from the output terminal 4B.

In FIG. 6B, a time $T_a$ is determined by a time which is required for circulating a light pulse through the optical loop at one cycle. A time $T_b$ corresponds to a period during which the control signal $S_c$ remains at a high level as shown in FIG. 6A, i.e., a period during which the optical switch 5 remains in an ON-state and the optical loop is formed.

Moreover, the conventional light pulse generator has a disadvantage in that, it is difficult for the conventional light pulse generator to generate an output light pulse $P_{op}$ having a long pulse width and a high power.

More specifically, the pulse width of the output light pulse (i.e., an interval time between half amplitude points) is shorter than the pulse width of the control signal $S_c$. Such a pulse width is not sufficiently long. Furthermore, the energy of the output light pulse (i.e., a square of a hatched region in FIG. 6B) is not high enough.

In order to make the pulse width of the light pulse $P_{op}$ longer, the following methods may be used.

a. Making the pulse width of the control signal $S_c$ longer.
b. Making the length of the optical loop (i.e., the propagation delay time of the signal light of the optical loop) longer.
c. Changing the characteristics of the erbium-doped optical fiber 1.

However, even if the pulse width of the control signal $S_c$ is changed so as to be longer, the pulse width of the light pulse $P_{op}$ does not exceed a predetermined width. Furthermore, it is troublesome to change the erbium-doped optical fiber for an another optical fiber having a different length and different characteristics. Furthermore, when changing the erbium-doped optical fiber 1, it is necessary to adjust the wavelength and the power of the pumped-light emitted by the pumped-light source 2 so as to conform with the new optical fiber.

Furthermore, the waveform of the output light pulse of the conventional light pulse generator is distorted and has steps as shown in FIG. 6B.

If such a distorted light pulse is used for OTDR and the distorted light pulse is supplied to an optical system to be analyzed, a reflected light having a distorted waveform is observed. Therefore, it is difficult to accurately analyze the optical system.

In order to obtain a light pulse $P_{op}$ having no distortion, it is necessary to change the characteristics of the erbium-doped optical fiber 1 or of the pumped-light source 2. However, such a design is difficult to construct which allows these kinds of changes.

SUMMARY OF THE INVENTION

Accordingly, it is an object of the present invention to provide a light pulse generator which can generate light pulses having a long pulse width and very low distortion at a high power without a design change in the erbium-doped optical fiber or in the pumped-light source.

In an aspect of the present invention, there is provided a light pulse generator comprising an optical main-loop, a pumped-light source, a delay optical fiber. The optical main-loop is a means for circulating a light and for forming a stepped light pulse. The optical main-loop includes a light mixer for mixing the pumped-light and another light, a light isolator for transmitting the mixed pumped-light and another light in one direction, an erbium-doped optical fiber for accumulating the mixed light transmitted through the light isolator, an optical switch for allowing the accumulated light to pass through as circulating light, a light divider for dividing the circulating light into a plurality of circulating lights, and a optical fiber coupler having input terminals and output terminals for mixing one of the divided plurality of lights inputted into one of the input terminals and for dividing the mixed light into a plurality of lights and for introducing one of the divided plurality of lights from one of the output terminals into the light mixer as said another light. The pumped-light source generates a pumped-light and introduces the pumped-light into the optical main-loop through the light mixer. The delay optical fiber input terminal is connected to the one of the optical fiber coupler output terminals and the delay optical fiber output terminal is connected to the another input terminals so as to form an optical sub-loop for spreading a pulse width of the stepped light pulse circulating in the optical main-loop. As a result, The stepped light pulse then circulates through the optical main-loop and a positive feed back amplification is carried out in the optical main-loop. The pulse width of the stepped light pulse circulating in the optical main-loop is spread by the optical sub-loop. As a result, an output light pulse having a sufficiently long pulse width and of sufficiently high power is picked up from the optical loop through the light divider.

BRIEF DESCRIPTION OF THE DRAWINGS

FIG. 4 shows a modification of the light pulse generator shown in FIG. 1.

FIG. 5 is a block diagram showing the configuration of a conventional light pulse generator.

FIG. 6A shows a waveform of a control signal used in the light pulse generator shown in FIG. 5.

FIG. 6B shows a waveform of an output light pulse obtained from the light pulse generator shown in FIG. 5.

DETAILED DESCRIPTION OF THE PREFERRED EMBODIMENTS

Figure 1:
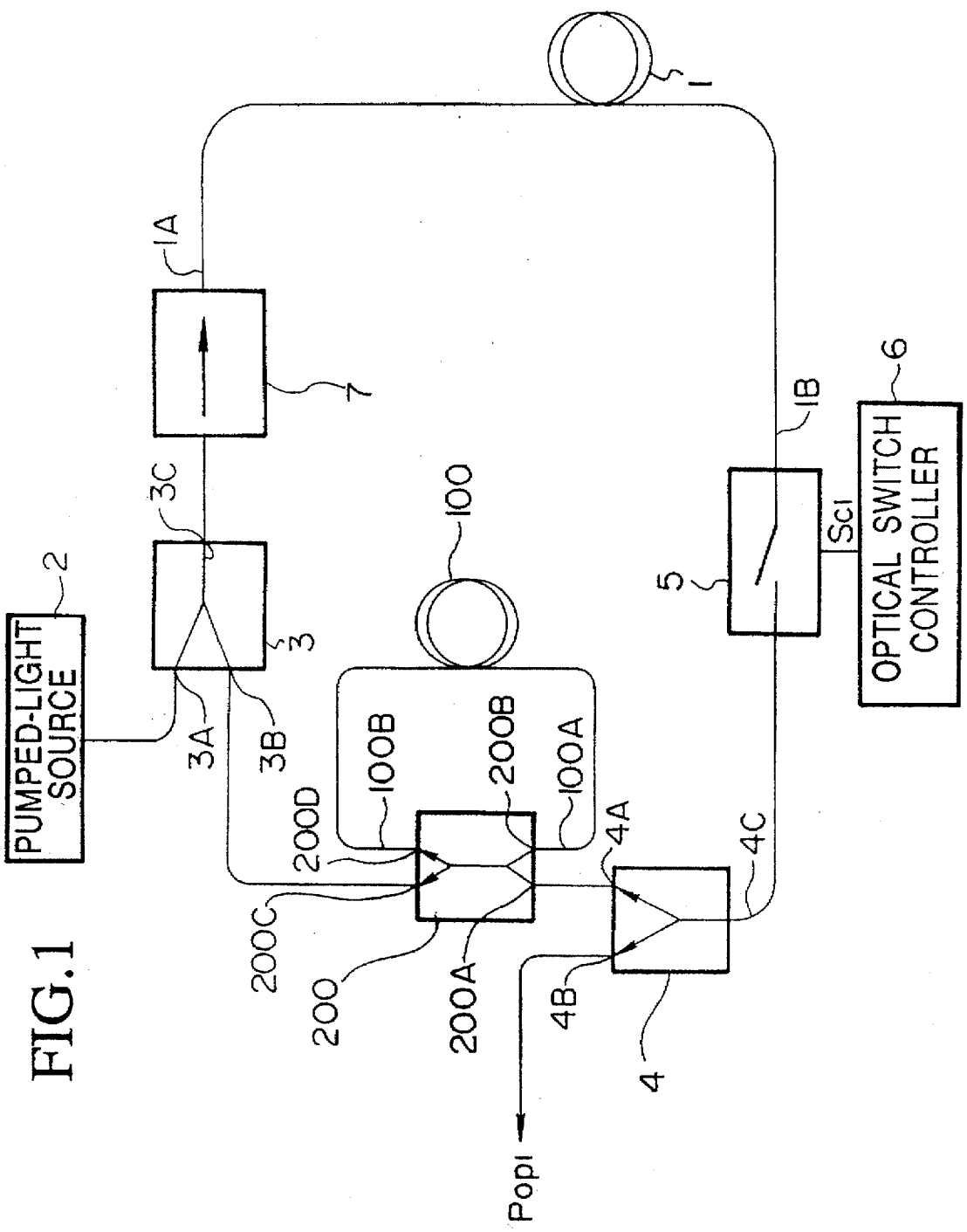
FIG. 1 is a block diagram showing the configuration of a light pulse generator according to a preferred embodiment of the present invention.

FIG. 1 is a block diagram showing the overall structure of a light pulse generator according to a preferred embodiment of the present invention. The members shown in FIG. 1 which are identical to those in the conventional light pulse generator shown in FIG. 5 are designated by the same reference numerals, and description thereof will therefore be omitted.

In the light pulse generator shown in FIG. 1, an optical fiber coupler 200 and a delay optical fiber 100 are inserted between the light mixer 3 and the light divider 4.

The optical fiber coupler 200 has input terminals 200A and 200B and output terminals 200C and 200D. The input terminal 200A is connected to the output terminal 4A of the light divider 4 via an optical fiber. The output terminal 200C is connected to the input terminal 3B of the light mixer 3 via an optical fiber. The Input terminal 200B is connected to a terminal 100A of the delay optical fiber 100. The output terminal 200D is connected to another terminal 100B of the delay optical fiber 100. An input light to the input terminal 200A is divided by the optical fiber coupler 200. 1/5 of the input light is outputted from the output terminal 200C of the optical fiber coupler 200. 4/5 of the input light is outputted from the output terminal 200D of the optical fiber coupler 200.

The delay optical fiber 100 delays an input light pulse by a delay time. The delay time of the delay optical fiber 100 is equal to a pulse width of the input light pulse.

In this preferred embodiment, the optical fiber coupler 200 and the delay optical fiber 100 constitute an optical sub-loop.

On the other hand, the light mixer 3, the light isolator 7, the erbium-doped optical fiber 1, the optical switch 5, the light divider 4, and the optical fiber coupler 200 constitute an optical main-loop. This optical main-loop is closed when the optical switch 5 is set to an ON-state by the control signal $S_{c1}$ from the optical switch controller 6.

Next, description will be given with respect to the operation of the light pulse generator.

When the level of the control signal $S_{c1}$ is low, the optical switch 5 is in an OFF-state and the optical main-loop is opened. Therefore, the following operation is carried out.

The pumped-light emitted from the pumped-light source 2 is supplied to the input terminal 3A of the light mixer 3. This pumped-light is outputted from the output terminal 3C of the light mixer 3 and the pumped-light thus outputted is supplied to the erbium-doped optical fiber 1 via the light isolator 7. Energy is accumulated in the erbium-doped optical fiber 1 due to the pumped-light thus supplied. However, the optical switch 5 is in the OFF-state. Therefore, no signal light is supplied to the light divider 4 from the erbium-doped optical fiber 1.

When the control signal $S_{c1}$ is changed to a high level, the optical switch 5 turns to an ON-state and the optical main-loop is closed. As a result, the energy accumulated in the erbium-doped optical fiber 1 is outputted from the terminal 1B as a light pulse having a wavelength band of 1.55 μm and the circulation of the light pulse is started in the closed optical main-loop.

The optical sub-loop consisting of the optical fiber coupler 200 and the delay optical fiber 100 then acts as a means for spreading the pulse width of the light pulse in the optical main-loop. Description will be given with respect to the operation of the optical sub-loop.

Figure 2A:
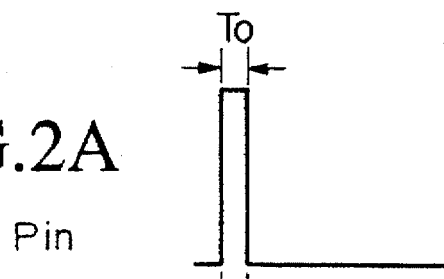
FIGS. 2A and 2B are waveform charts showing an operation of an optical sub-loop of the preferred embodiment.
Figure 2B:
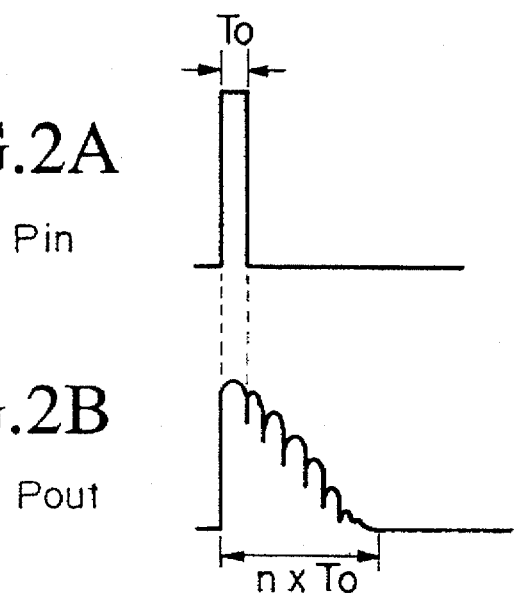

Suppose there is a case in which a light pulse $P_{in}$ having a rectangular waveform shown and a pulse width $T_o$ as shown in FIG. 2A is inputted to the input terminal 200A of the optical fiber coupler 200. The input light pulse $P_{in}$ is divided by the optical fiber coupler 200. 1/5 of the input light pulse $P_{in}$ is outputted from the output terminal 200C and is supplied to the light mixer 3. 4/5 of the input light pulse is outputted from the output terminal 200D and the light pulse thus outputted is delayed by the delay optical fiber 100 by a delay time of $T_o$ which is equal to the pulse width $T_o$ of the light pulse $P_{in}$. The light pulse thus delayed is supplied to the input terminal 200B of the optical fiber coupler. The input light of the input terminal 200A and the input light pulse of the input terminal 200B are mixed and the mixed light is divided by the optical fiber coupler 200. 1/5 of the mixed light is outputted from the output terminal 200C, and 4/5 of the mixed light is outputted from the output terminal 200D. The light outputted from the output terminal 200D is delayed by the delay optical fiber 100 and is fed-back to the optical fiber coupler 200. In this manner, the circulation of the light pulse is repeated in the optical sub-loop. As a result, light pulse $P_{out}$, the waveform of which is shown in FIG. 2B, is obtained from the output terminal 200C of the optical fiber coupler 200. As shown in FIG. 2B, the output light pulse $P_{out}$ has a gentle negative slope like an exponential curve and the output light pulse has a pulse width $n \times T_o$ (n is an integer).

In the optical main-loop, the light pulse outputted from the output terminal 4A of the divider 4 is supplied to the optical sub-loop and the pulse width of the light pulse is spread by the sub-loop. The light pulse thus spread circulates through the optical main-loop and a positive-feedback amplification is carried out in the optical main-loop. As a result, the level of amplitude of the light pulse circulating in the main-loop is gently increased. On the other hand, the energy accumulated in the erbium-doped optical fiber 1 is gently decreased due to the light emission. Thus, the level of amplitude of the light pulse in the optical main-loop is gently decreased due to the decrease of the accumulated energy of the erbium-doped optical fiber 1. The light pulse circulating in the optical main-loop is picked up from the output terminal 4B of the light divider 4.

Figure 3A:
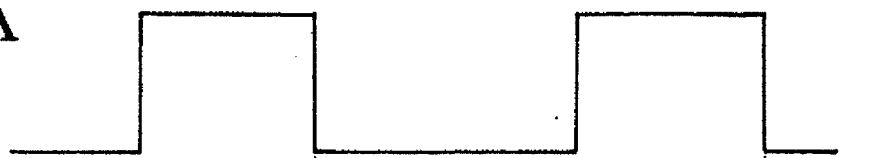
FIG. 3A shows a waveform of a control signal Sc1 used in the preferred embodiment.
Figure 3B:
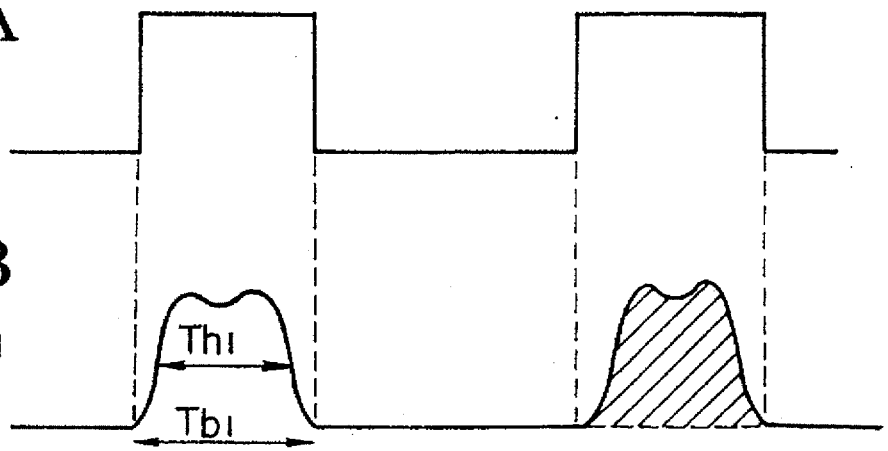
FIG. 3B shows a waveform of an output light pulse obtained from the preferred embodiment.

FIG. 3A shows a waveform of the control signal Sc1. FIG. 3B shows a waveform of the output light pulse $P_{op1}$ obtained from the output terminal 4B of the light divider 4. In FIG. 3B, time $T_{h1}$ corresponds to a period during which the control signal $S_{c1}$ remains at a high level as shown in FIG. 3A, i.e., a period during which the optical switch 5 remains in an ON-state and the optical main-loop is formed. $T_{h1}$ is a pulse width (i.e., an interval time between half amplitude points) of the light pulse $P_{op1}$.

In the conventional light pulse generator, the distorted light pulse having rough steps is obtained as shown in FIG. 6B. In the preferred embodiment, a light pulse $P_{op1}$ having a smooth shape and very low distortion is obtained as shown in FIG. 3B. Furthermore, the pulse width $T_{h1}$ of the light pulse $P_{op1}$ is enough long and the energy of the light pulse (i.e., a hatched region in FIG. 3B) is sufficiently rich.

The range of the present invention is not limited to the range of the preferred embodiment. Various modification may be carried out based on the present invention.

FIG. 4 shows an example of a modification of the preferred embodiment. The members which are identical to those of the light pulse generator shown in FIG. 1 are designated by the same reference numerals and description thereof will therefore be omitted.

In FIG. 4, reference numerals 9a and 9b delay adjustment optical fibers made of a quartz. These delay adjustment optical fibers 9a and 9b have different lengths. Reference numeral 300 designates an optical switch. An input terminal 300C of the optical switch 300 is connected to the terminal 1B of the erbium-doped optical fiber 1. The output terminals 300A and 300B of the optical switch 300 are respectively connected to input terminals of the delay adjustment optical fibers 9a and 9b. Reference numeral 400 designates a light mixer. Input terminals 400A and 400B of the light mixer 400 are respectively connected to output terminals of the delay adjustment optical fibers 9a and 9b. Reference numeral 8 designates a variable wavelength optical band pass filter which is inserted between an output terminal 400C of the light mixer 400 and the optical switch 5.

In this modification, the length of the delay adjustment optical fiber 9a is longer than the length of the delay adjustment optical fiber 9b. Therefore, the pulse width of an output light pulse $P_{op3}$ obtained from the light divider 4 can be controlled by selecting the desired one of the delay adjust optical fibers 9a and 9b by the optical switch 300. Furthermore, it is possible to control the wavelength of the output light pulse $P_{op3}$ by adjusting the pass band of the variable wavelength optical band pass filter 8.

The light pulse generators shown in FIGS. 1 and 4 are examples of the configuration of the light pulse generator according to the present invention. In these generators, a plurality of optical elements are included in the optical main-loop. These optical elements may be alternated in the optical main-loop.

What is claimed is:

1. A light pulse generator for generating a stepped light pulse and for converting the stepped light pulse into a broader non-stepped light pulse, the generator comprising:

a pumped-light source for generating a pumped-light;

an optical main-loop for circulating light and for forming a stepped light pulse, the optical main-loop comprising:

a light mixer for mixing the pumped-light and another light, a light isolator for transmitting the mixed pumped-light and another light in one direction, an erbium-doped optical fiber for accumulating the mixed light transmitted through the light isolator, an optical switch for allowing the accumulated light to pass through as circulating light, a light divider for dividing the circulating light into a plurality of circulating lights, and an optical fiber coupler having input terminals and output terminals for mixing one of the divided plurality of lights inputted into one of the input terminals and another light inputted into another input terminals, and for dividing the mixed light into a plurality of lights and for introducing one of the divided plurality of lights from one of the output terminals into the light mixer as said another light; and a delay optical fiber, the delay optical fiber having a delay optical fiber input terminal and a delay optical fiber output terminal, the delay optical fiber input terminal being connected to the one of the optical fiber coupler output terminals and the delay optical fiber output terminal being connected to the another input terminals of the optical fiber coupler so as to form an optical sub-loop for spreading a pulse width of the stepped light pulse circulating in the optical main-loop;

wherein the stepped light pulse formed by the optical main-loop is converted into a non-stepped light pulse having a width broader than that of the stepped light pulse.

2. A light pulse generator according to claim 1, wherein the optical main-loop includes a plurality of delay adjustment optical fibers having different lengths and an optical switch for inserting one of the delay adjust optical fibers into the optical main-loop.

3. A light pulse generator according to claim 1, wherein the optical main-loop includes a variable wavelength optical band pass filter.

* * * * *